No. 640,301. Patented Jan. 2, 1900.
M. W. MIRACLE.
CHEESE KNIFE.
(Application filed Mar. 28, 1899.)
(No Model.)
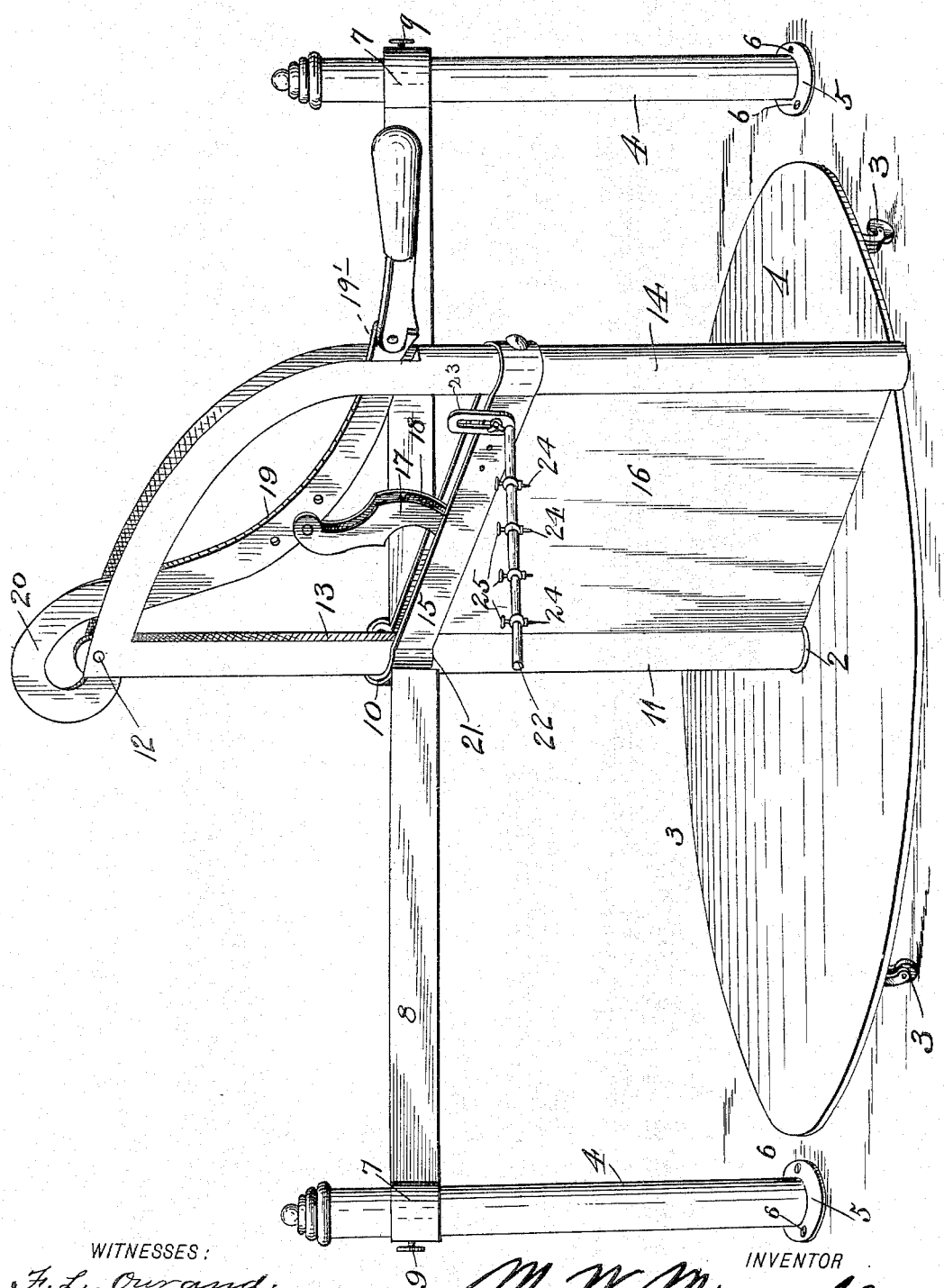
WITNESSES:
F. L. Ourand
F. S. Duffie
INVENTOR
M. W. Miracle
BY John S. Duffie
ATTORNEY

UNITED STATES PATENT OFFICE.

MERIDITH W. MIRACLE, OF HUNTSVILLE, ARKANSAS, ASSIGNOR OF ONE-THIRD TO W. N. WILLIAMS, S. B. GILLILAND, J. B. HARRIS, AND H. L. BAKER.

CHEESE-KNIFE.

SPECIFICATION forming part of Letters Patent No. 640,301, dated January 2, 1900.

Application filed March 28, 1899. Serial No. 710,792. (No model.)

*To all whom it may concern:*

Be it known that I, MERIDITH W. MIRACLE, a citizen of the United States, residing at Huntsville, in the county of Madison and State of Arkansas, have invented certain new and useful Improvements in Cheese-Knives, of which the following is a specification.

My invention relates to cheese-knives; and it consists of the novel construction and arrangement of its parts, as hereinafter set out in this specification and claims thereunto attached.

The figure on the accompanying sheet is a perspective view of my invention.

My invention is described as follows:

1 is a circular base on which the cheese is mounted. It is provided with a central opening 2 and casters 3, so that the base may be easily rotated.

4 are posts or upright rods, which may be solid or hollow and are firmly fastened to the floor of the cheese-case by means of feet 5 and screws 6 or other suitable means. The upper ends of these posts 4 pass through the end loops 7 of the bar 8 and are adjustably secured therein by set-screws 9. In the middle of the bar 8 is a bow 10 to accommodate one of the loop ends of the slot-bar. Extending upward from the center of the base 1 and through the loop 10 and some distance above the same is a hollow post 11, provided with an upper perforation 12 and a slot 13 its entire length. Extending from the periphery of the base 1 perpendicularly to a point a little above the bar 8 and then bending over and joining to the upper end of post 11 is a post 14. The upper part of the post 14 is bifurcated from its top end down to a point opposite the bar 8, forming a guide for lever 19, and from said point it is slotted to its bottom end. In this last-mentioned slot and the slot 13 and through the slot-bar 15 works up and down a knife 16. This knife 16 is pivoted to the lower ends of the arms 17 and 18, the upper ends of said arms being adjustably pivoted to the lever 19. This lever 19 has a U curve at its upper end and is pivoted in the upper end of the post 11. The slot-bar is adjustably secured to posts 11 and 14 by screws. One end of said slot-bar is doubled back so as to form or nearly form a ring 21 and is secured to the post 11 and is adapted to turn inside of the loop 10 of the bar 8, so that said post 11 and post 14, slot-bar 15, lever 19, and knife 16 may be turned from right to left or from left to right at will.

The rod 22, provided with a slotted right-angle part 23, is adjustably secured to slot-bar 15, so that said bar 22 will extend over the top of the cheese. Working on said rod 22 are markers 24, adjustably secured in place by set-screws 25.

In operation the knife 16 is raised until its cutting edge is above the top of the cheese cake, a hole made through the center of the cheese, and the post 11 is thrust down through said hole, while the post 14 passes down on the outside of the cheese cake, the posts 4 secured in place, and the knife is ready for use. The knife is then pressed down to the base 1, and the markers are set to cut any size piece of cheese desired.

Having described my invention, what I claim as new, and desire to secure by Letters Patent, is—

1. A device for cutting cheese consisting of the base 1, having a central opening 2, and casters 3; upright posts 4 secured to the floor of the case by feet and screws 5, 6; bar 8, having bow 10 and loops 7, adjustably secured to posts 4; hollow and slotted post 11; hollow, bifurcated and slotted post 14 joined at its upper end to post 11; slot-bar 15, adjustably secured to posts 11 and 14; lever 19, pivoted in the upper ends of posts 11 and 14; knife 16 adjustably pivoted to lever 19, by arms 17 and 18 and working up and down in the slots of posts 11 and 14; rod 22, having right-angle slotted part 23 adjustably secured to slot-bar 15, and markers 24, adjustably secured on rod 22 by set-screws 25, substantially as shown and described and for the purposes set forth.

2. A device for cutting cheese, consisting of a base 1, having a central opening 2; upright post 4, secured in place by any suitable means; bar 8, adjustably secured to post 4; slotted posts 11, adapted to turn in the base 1; bifurcated and slotted bar 14, joined at its upper end to post 11; slot-bar 15, adjustably secured to said posts 11 and 14; lever 19, having joint 19', and pivoted and working up and down in the bifurcated end of post 14; knife 16, adjustably pivoted to levers 19, by arms 18 and 17, and working up and down in the slots of posts 11 and 14, with means for measuring the cheese cuts, substantially as shown and described.

In testimony whereof I affix my signature in presence of two witnesses.

MERIDITH W. MIRACLE.

Witnesses:
H. L. BAKER,
S. B. GILLILAND.